(12) United States Patent
Kimura

(10) Patent No.: US 6,742,492 B2
(45) Date of Patent: Jun. 1, 2004

(54) APPARATUS AND A METHOD FOR CONTROLLING A DIESEL ENGINE

(75) Inventor: Shuji Kimura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 15 days.

(21) Appl. No.: 10/300,741

(22) Filed: Nov. 21, 2002

(65) Prior Publication Data

US 2003/0111041 A1 Jun. 19, 2003

(30) Foreign Application Priority Data

Dec. 18, 2001 (JP) .................................... 2001-385071

(51) Int. Cl.7 .............................................. F02B 17/00
(52) U.S. Cl. .................................. 123/295; 123/305
(58) Field of Search ................................ 123/295, 305, 123/430, 308, 568.11, 568.21

(56) References Cited

U.S. PATENT DOCUMENTS 5,992,372 A * 11/1999 Nakajima .................... 123/295
6,390,057 B2 * 5/2002 Yoshizawa et al. ......... 123/295

FOREIGN PATENT DOCUMENTS

JP 2864896 A 1/1995
JP 8-086251 A 4/1996

* cited by examiner

*Primary Examiner*—Mahmoud Gimie
(74) *Attorney, Agent, or Firm*—Foley & Lardner LLP

(57) ABSTRACT

In a diesel engine, heavy EGR lowers a combustion temperature, which greatly prolongs an ignition delay period and all fuel is injected within the ignition delay period, thereby performing a low-temperature premixed combustion. A crank angle from a fuel injection completion to an ignition start is made less than 15 degrees by advancing a fuel injection timing and/or prolonging a fuel injection period. As a result, an equivalent ratio distribution in a combustion chamber at an ignition start is controlled such that an equivalent ratio in the vicinity of a cylinder center is richer than in the vicinity of a cylinder wall and the equivalent ratio gradually changes from the cylinder center to the cylinder wall.

12 Claims, 10 Drawing Sheets

APPARATUS AND A METHOD FOR CONTROLLING A DIESEL ENGINE

FIELD OF THE INVENTION

The present invention relates to an apparatus and a method for controlling a diesel engine.

BACKGROUND INFORMATION

There is known an earlier diesel engine of a direct fuel injection type where a combustion temperature in a combustion chamber is lowered by introducing heavy EGR, known as exhaust gas recirculation, back into the combustion chamber. Under this approach, an ignition delay period is largely prolonged so as to build a heat release pattern with one-step combustion shape (the ignition delay period is longer than a fuel injection period) called a low temperature-premixed combustion, and thereby, NOx and smokes are reduced at the same time.

In this engine, the premixing is further expanded by dispersing fuel into the entire combustion chamber due to formation of a high swirl in the combustion chamber and a cylindrical shape of the combustion chamber (see Japanese Unexamined Patent Publication No. 8-86251).

SUMMARY OF THE INVENTION

However, in the above diesel engine, the ignition delay period is too long compared to the fuel injection period either under relatively colder engine conditions or a lowered compression ratio.

As a result, when time from a fuel injection completion to an ignition start becomes too long, fuel is dispersed too much into the entire combustion chamber and an equivalent ratio of fuel to air in the vicinity of a cylinder center (in a piston cavity) becomes extremely lean. Therefore, an emission quantity of unburned hydrocarbons (HC) is increased.

One aspect of the invention provides an apparatus for controlling a diesel engine where a combustion temperature in a combustion chamber is lowered, and an ignition delay period is largely prolonged so as to build a heat release pattern with one-step combustion shape, as well as an equivalent ratio distribution in the combustion chamber at an ignition start is controlled such that the equivalent ratio in the vicinity of a cylinder center is relatively richer compared with that in the vicinity of a cylinder wall and the equivalent ratio gradually changes from the cylinder center to the cylinder wall.

These and other objects and features of this invention will be understood from the following description with accompanying drawings.

DETAILED DESCRIPTION OF THE PREFERRED EMBODIMENTS

Preferred embodiments according to the invention will be explained with reference to the drawings as follows.

There is known an earlier technology that in general, when fuel injection starts in a diesel engine, a mixing vaporization due to vaporized fuel is promoted. When a temperature and pressure in a cylinder reach a predetermined value, a mixture starts to burn (premixed combustion) which increases the temperature and pressure in the cylinder. Afterwards fuel injected vaporizes as soon as the fuel is injected, and the vaporized fuel burns (diffusion combustion).

Under this condition, a period (ignition delay period) from an injection start to an occurrence of the premixed combustion is shorter compared with an entire combustion period, and therefore, the diffusion combustion becomes the main combustion.

On the other hand, Japanese Issued Patent No. 2864896 discloses that the ignition delay period is largely prolonged by lowering a combustion temperature, as well as by injecting all the fuel within an ignition delay period, a ratio of the premixed combustion to the diffusion combustion becomes larger, and thereby the premixed combustion becomes the main combustion.

In general, a combustion state where the diffusion combustion is the main combustion and a combustion state where the premixed combustion is the main combustion are switched depending on an engine operating condition.

Figure 1:
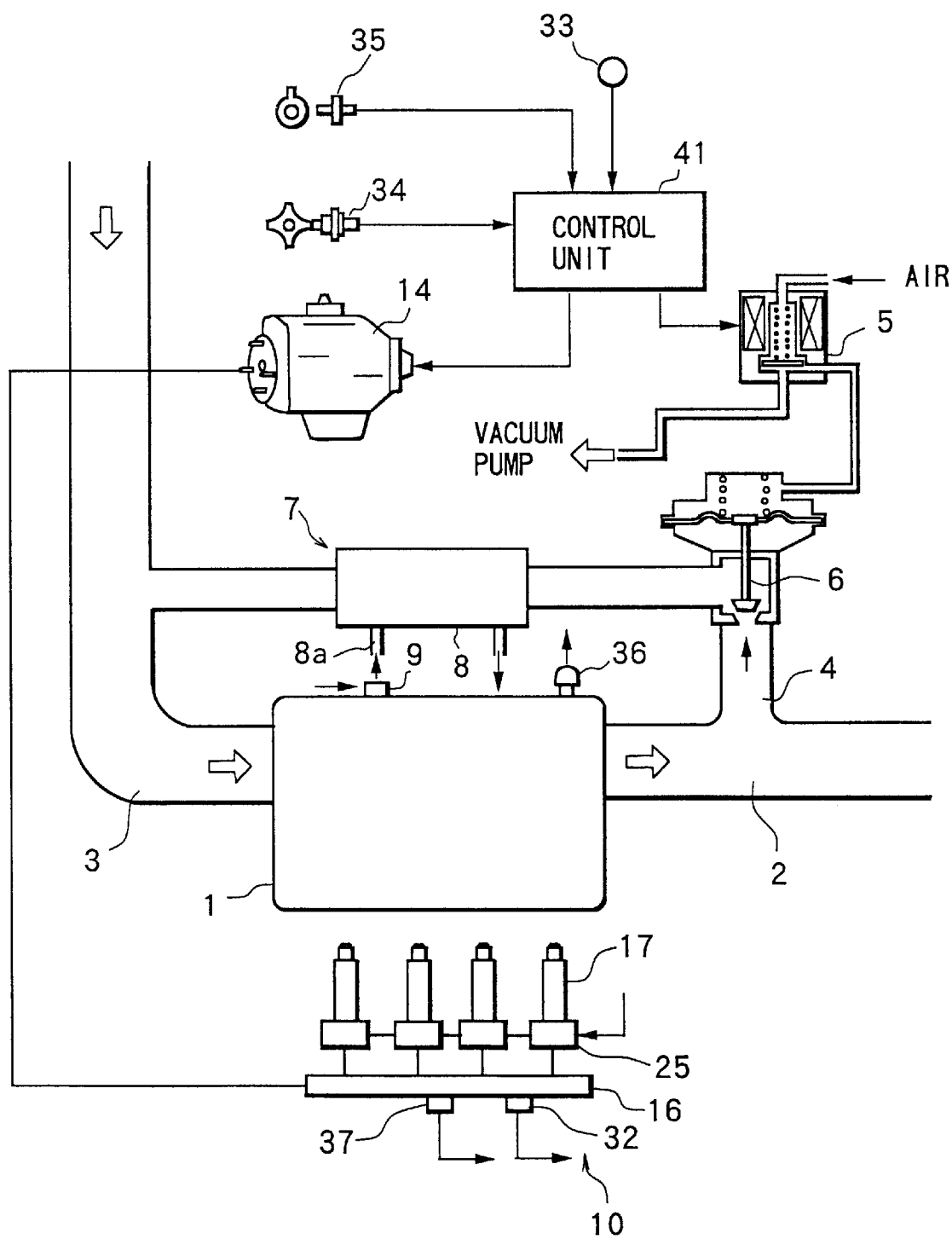
FIG. 1 is an engine structure view showing a first embodiment of the invention.

FIG. 1 shows an engine structure for performing a low-temperature-premixed combustion. This general structure is disclosed in Japanese Unexamined Patent Publication No. 8-86251, though the unique control method described below is not in the JP publication.

Since generation of NOx depends on combustion temperature, lowering the combustion temperature will reduce the generation of NOx. In the low temperature-premixed combustion, since a low temperature combustion is realized by decreasing an oxygen density due to EGR, an EGR passage connecting an exhaust passage of an engine 1 to an intake passage thereof is equipped with a diaphragm type EGR valve 6 driven by a control negative pressure from a negative pressure control valve 5.

Negative pressure control valve 5 is driven by a duty control signal from a control unit 41 to obtain a certain EGR rate corresponding to an engine operating condition. A cooling apparatus 7 for EGR gases is disposed about a half way in EGR passage 4. Cooling apparatus 7 is formed around EGR passage 4 and comprises a water jacket 8 where part of an engine cooling water is recirculated, and a flow control valve 9 disposed at an introduction port 8a of the cooling water will adjust a recirculation quantity of the cooling water.

Figure 2:
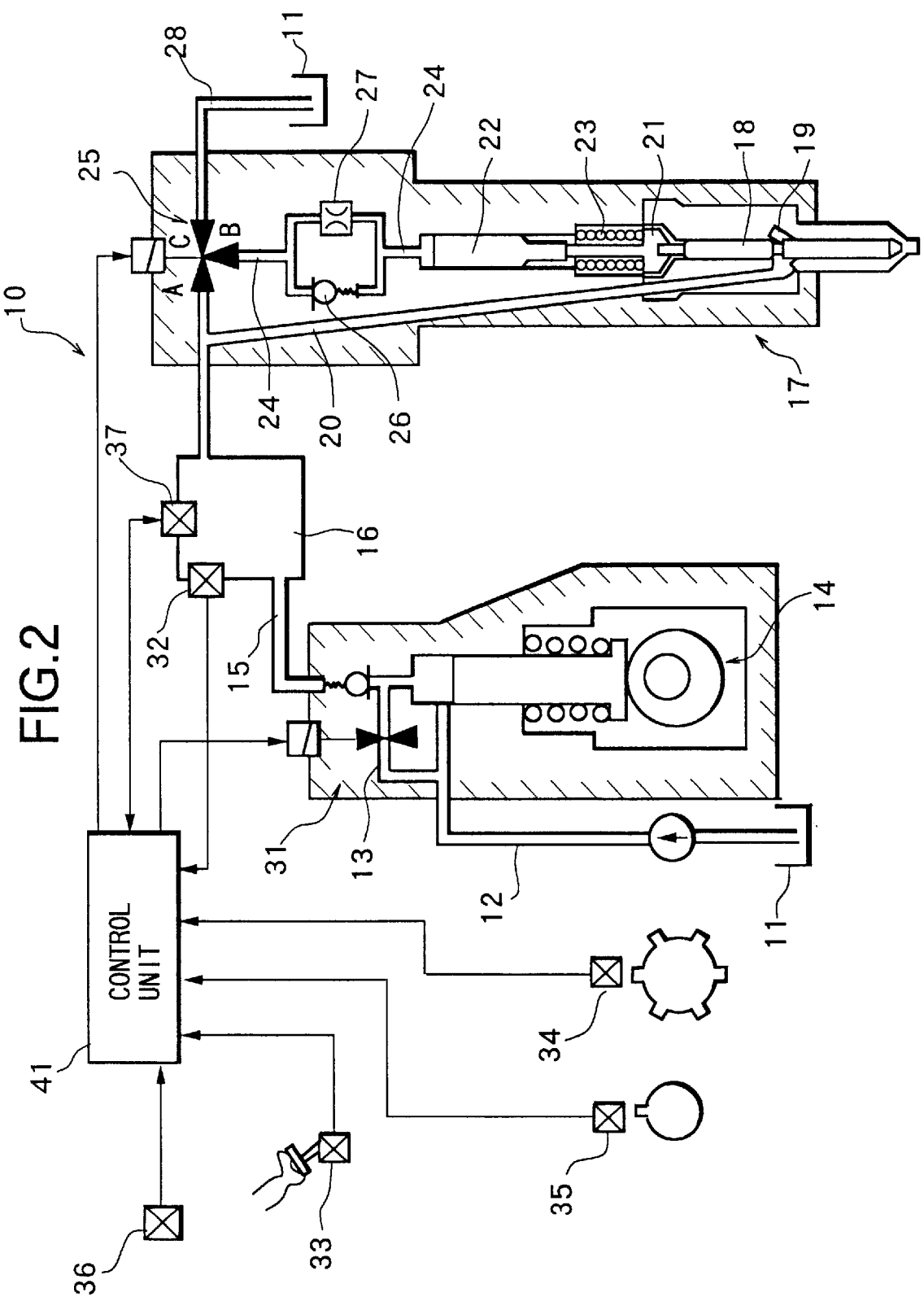
FIG. 2 is a structure view of a common rail injection system according to the first embodiment.

A cooling degree by the EGR gases is controlled by an increase of the recirculation quantity through flow quantity valve 9 based upon a command of control unit 41. Engine 1 has a fuel injection apparatus 10 of a common rail type, a structure of which is also known (The thirteenth Internal Combustion Engine Symposium Lectures, page 73~77) will be explained briefly. Of course, any number of other conventional strictures may be employed for fuel injection within the scope of the present invention. As shown in FIG. 2, fuel injection apparatus 10 comprises a fuel tank 11, a fuel supply passage 12, a supply pump 14, a fuel supply passage 15, a common rail 16, and a fuel injection nozzle 17 disposed for each cylinder.

The fuel pressurized by supply pump 14 is stored in common rail 16 through fuel supply passage 15 for some predetermined time and then is distributed to fuel injection nozzle 17 for each cylinder.

Fuel injection nozzle 17 comprises a needle valve 18, a nozzle chamber 19, a fuel supply passage 20 from common rail 16 to nozzle chamber 19, a retainer 21 attached to needle valve 18, an oil pressure piston 22 which can push needle valve 18 in a closing direction thereof through retainer 21, a return spring 23 which forces needle valve 18 in a closing direction thereof through retainer 21, a fuel supply passage 24 to oil pressure piston 22, a three-way electromagnetic valve 25 inserted in fuel supply passage 24, and a one-way delay valve (one-way valve 26 positioned paralleled to an orifice 27) inserted in fuel supply passage 24.

Opening and closing needle valve 18 are controlled by three-way valve 25. When three-way valve 25 is at an off state (port A and B are connected, and port B and C are disconnected), since a pressure receiving area of oil pressure piston 22 is larger than a pressure receiving area of needle valve 18, needle valve 18 is closed. On the other hand, when three-way valve 25 becomes at an on state (port A and B are disconnected, and port B and C are connected), the fuel in an upper side of oil pressure piston 22 is returned back to tank 11 through a return passage 28 and then, a fuel pressure enforcing on oil pressure piston 22 is lowered. Therefore, needle valve 18 raises up against a spring force of return spring 23 by fuel pressure enforcing on needle valve 18 in nozzle chamber 19 and becomes open, thereby starting injection.

When three-way valve 25 is back to the off state again, the fuel pressure enforces on oil pressure piston 22 again to close needle valve 18 and the fuel injection ends. Controlling the timing of switching between an off state and an on state of three-way valve 25 determines fuel injection timing and an on-period thereof and fuel injection pressure (pressure in common rail 16) determines fuel injection quantity. An adjustment of the fuel injection pressure is performed by a pressure adjustment valve 31 disposed in a relief passage 13 which leads fuel pumped out by supply pump 14 back to an intake side. Namely, pressure adjustment valve 31 adjusts the discharge quantity to adjust the fuel injection pressure and control injection rate. Of course, many other conventional structures for the fuel injection valve and related components may be employed.

Control unit 41 receives signals for various controls from a pressure sensor 32 which detects a pressure (injection pressure) in common rail 16, an acceleration opening degree sensor 33 which detects an acceleration opening degree, an engine rotation speed sensor 34 which detects an engine rotation speed, a cylinder-identification sensor 35 which identifies a cylinder, a water temperature sensor 36 which detects an engine water temperature, and a fuel temperature sensor 37 which detects a fuel temperature.

Figure 3:
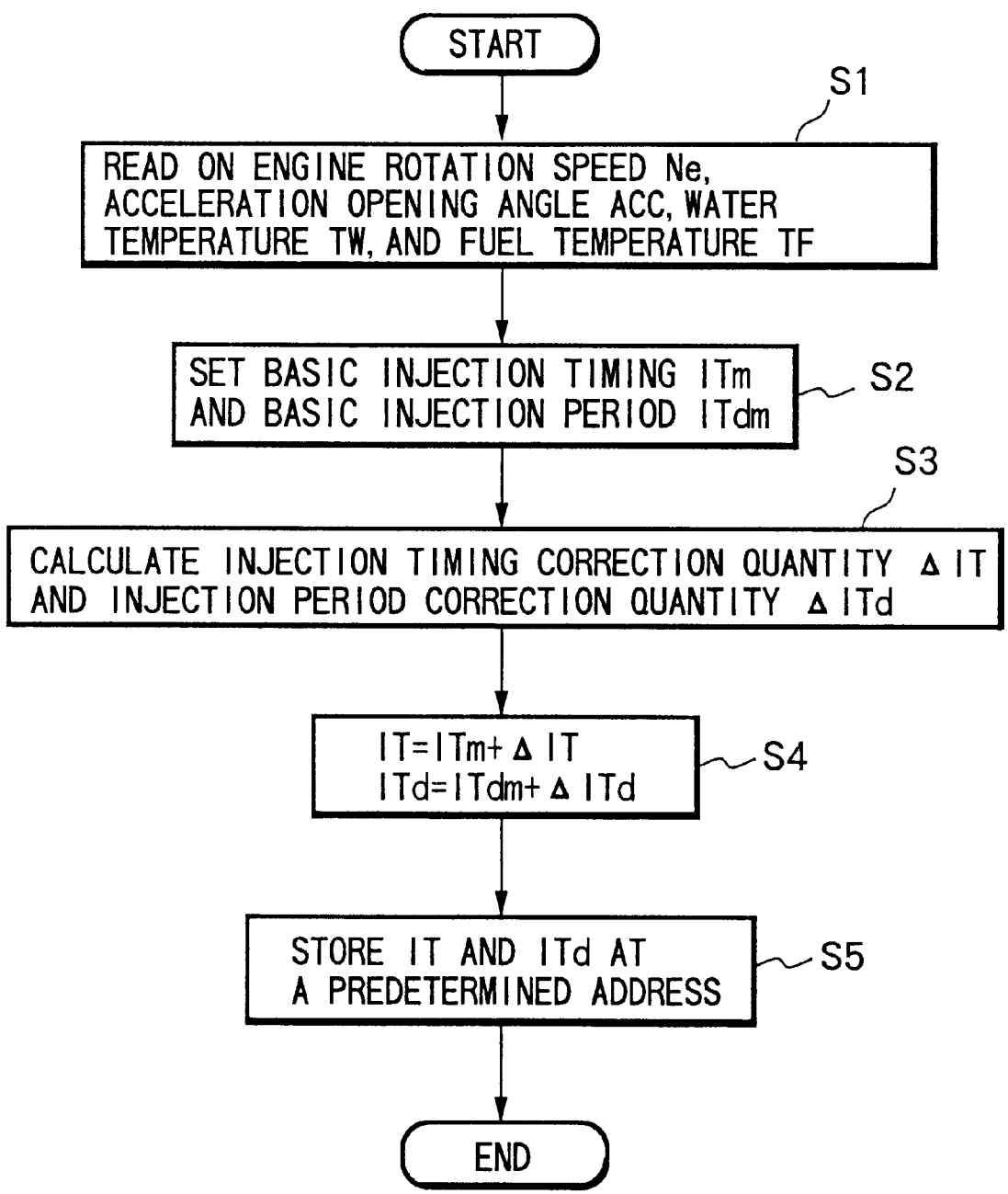
FIG. 3 is a control flowchart according to the first embodiment.
Figure 8:
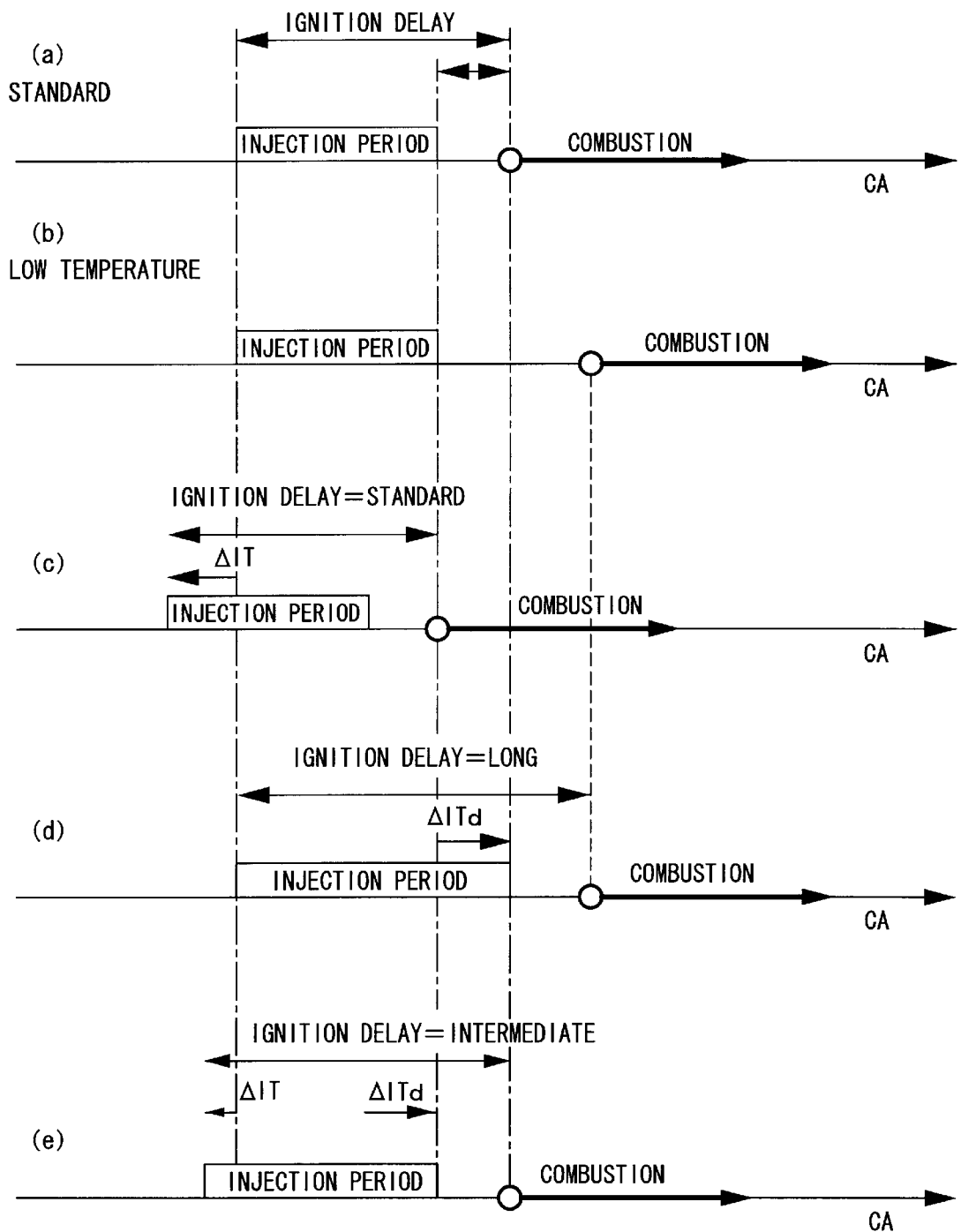
FIG. 8 is a view showing a relationship between an ignition delay period and an injection period.

Control in case of a low-temperature premixed combustion, for example, when an ignition delay period is prolonged too much at a cold condition (in case of a low temperature condition (b) to a standard engine operating condition (a) in FIG. 8) will be explained with reference to a control flowchart in FIG. 3.

At step S1, an engine rotation speed Ne, an acceleration opening degree ACC, an engine water temperature TW, and a fuel temperature TF are read.

At step S2, a basic injection timing ITm and a basic injection period ITdm are set based upon parameters of an engine operating condition which are engine rotation speed Ne and acceleration opening degree ACC.

At step S3, an injection timing correction quantity $\alpha$IT and an injection period correction quantity $\alpha$ITd are set based upon engine water temperature TW and/or fuel temperature TF.

At step S4, a final injection timing IT is determined by adding injection timing correction $\alpha$IT to basic injection timing ITm (IT=ITm+$\alpha$IT) and a final injection period ITd is determined by adding injection period correction quantity $\Delta$ITd to basic injection period ITdm (ITd=ITdm+$\alpha$ITd).

At step S5, the injection timing IT and the injection period ITd determined at step S4 are stored at a predetermined address and a fuel injection control is performed based upon these IT and ITd.

Namely, by monitoring the engine operating condition, the water temperature, and the fuel temperature, since an ignition delay period is too long, the control unit judges whether or not its correction is necessary. When the ignition delay period is too long, since the combustion (fuel ignition) becomes too delayed by a normal injection timing (basic injection timing ITm), a correction injection timing is calculated by correcting the injection timing in an advance side (IT=ITm+$\alpha$IT). That is, the injection timing is advanced by some predetermined amount.

However, just advancing the injection timing is not enough because since the ignition delay period is too long, it takes a long time from fuel injection completion to fuel ignition, in which time the fuel has spread out into the entire combustion chamber. As a result, an air fuel ratio becomes extremely lean at the center of the cylinder or the fuel gets into an area close to a cylinder wall (so called a quenching zone) and therefore, hydrocarbons (HC) increase rapidly.

In order to avoid this situation, the injection period is corrected to be longer compared to the normal injection period (basic injection period ITdm), i.e., ITd=ITdm+$\Delta$ITd. In detail, the injection period is prolonged by lowering an injection pressure (fuel pressure in the common rail) and thereby, a difference between an injection completion timing and an ignition start timing (i.e., start of premixed combustion) is controlled to be within 15 degrees of a crank angle.

Figure 4:
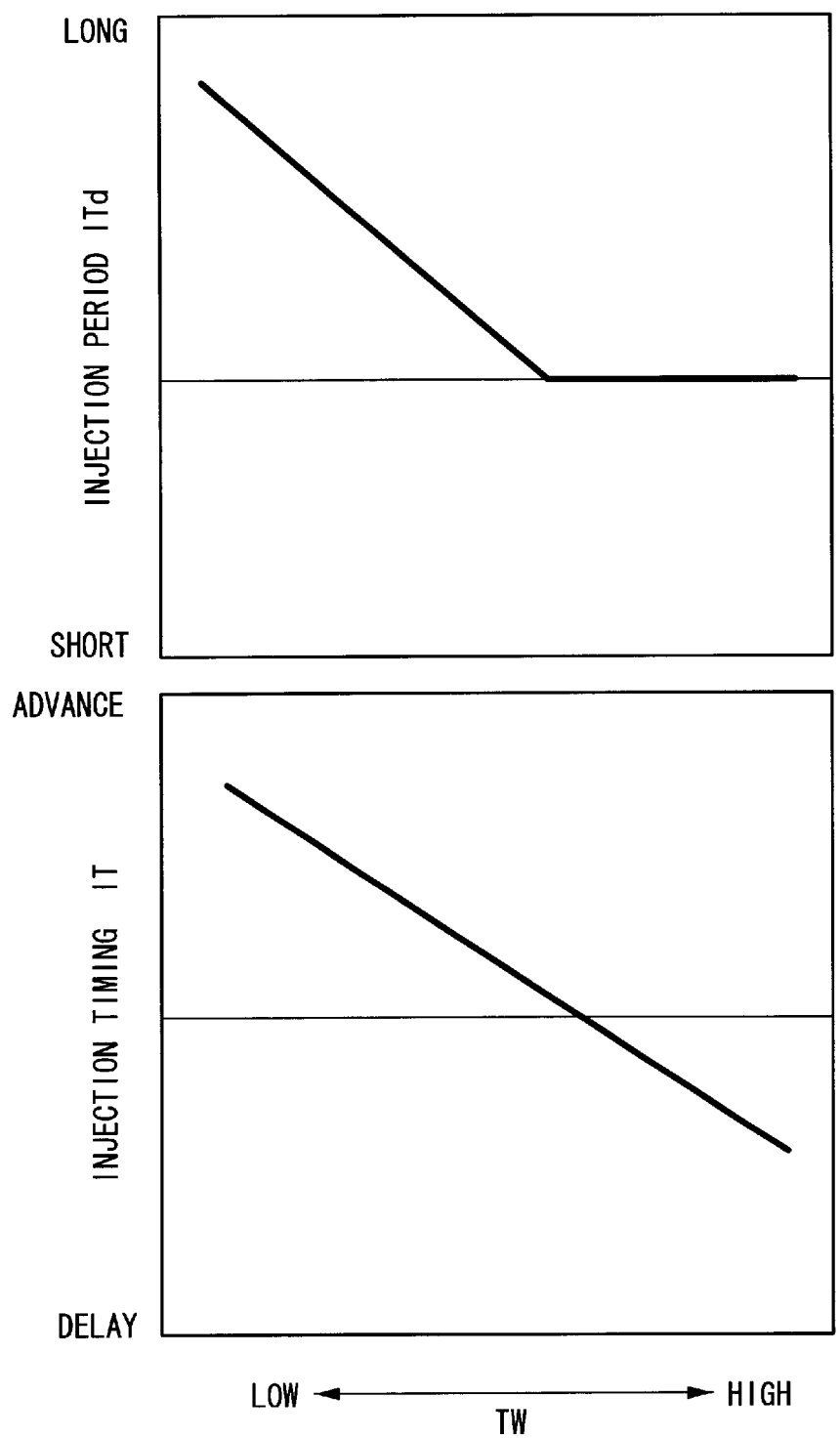
FIG. 4 is a view showing a first control example according to the first embodiment.
Figure 5:
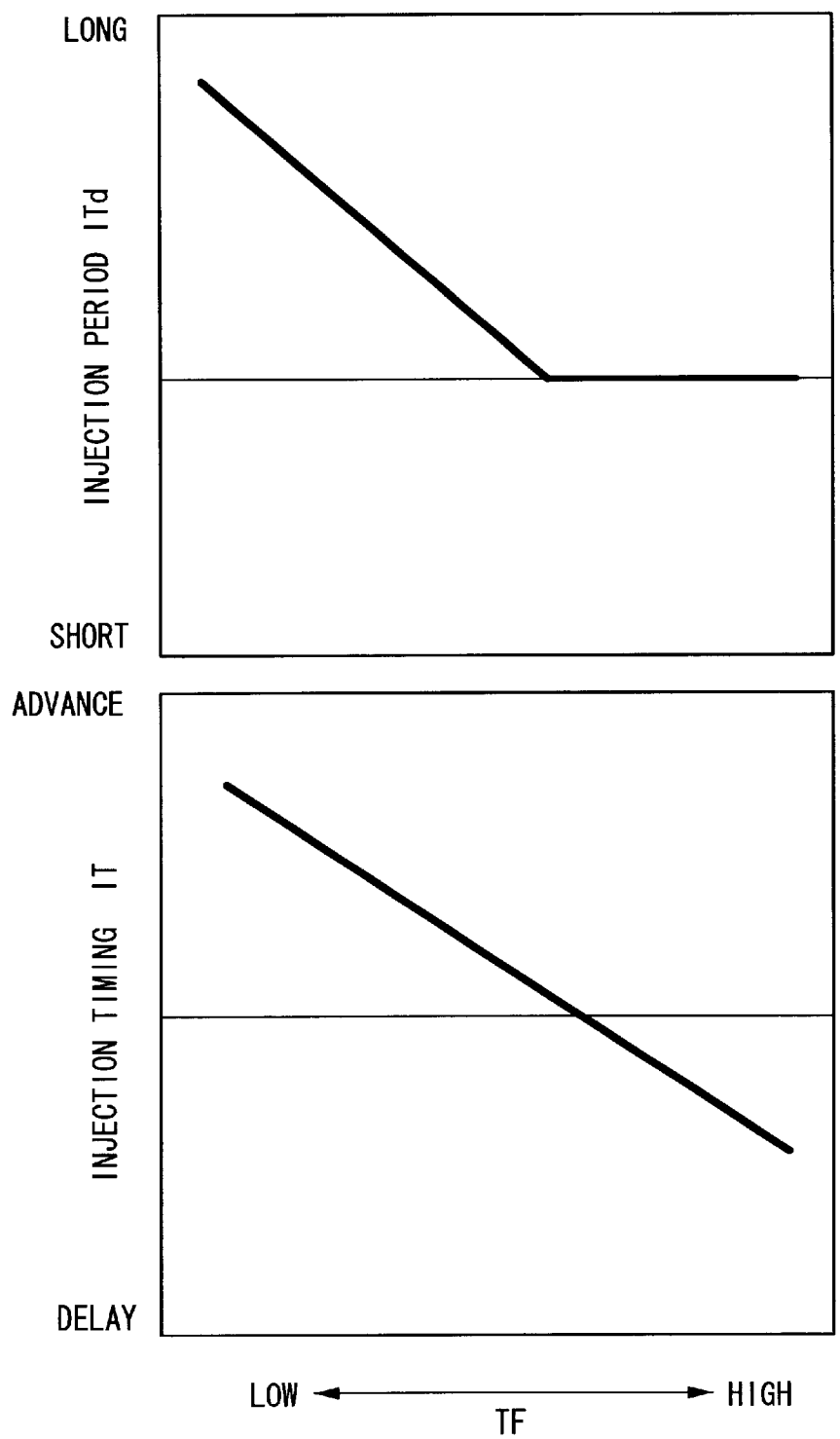
FIG. 5 is a view showing a second control example according to the first embodiment.

Controlling injection timing and injection period corresponding to a change of water temperature TW and fuel temperature TF is shown in FIG. 4 and 5. With lower temperature, the injection timing IT is increasingly advanced more and the injection period ITd is increasingly prolonged.

Figure 6:
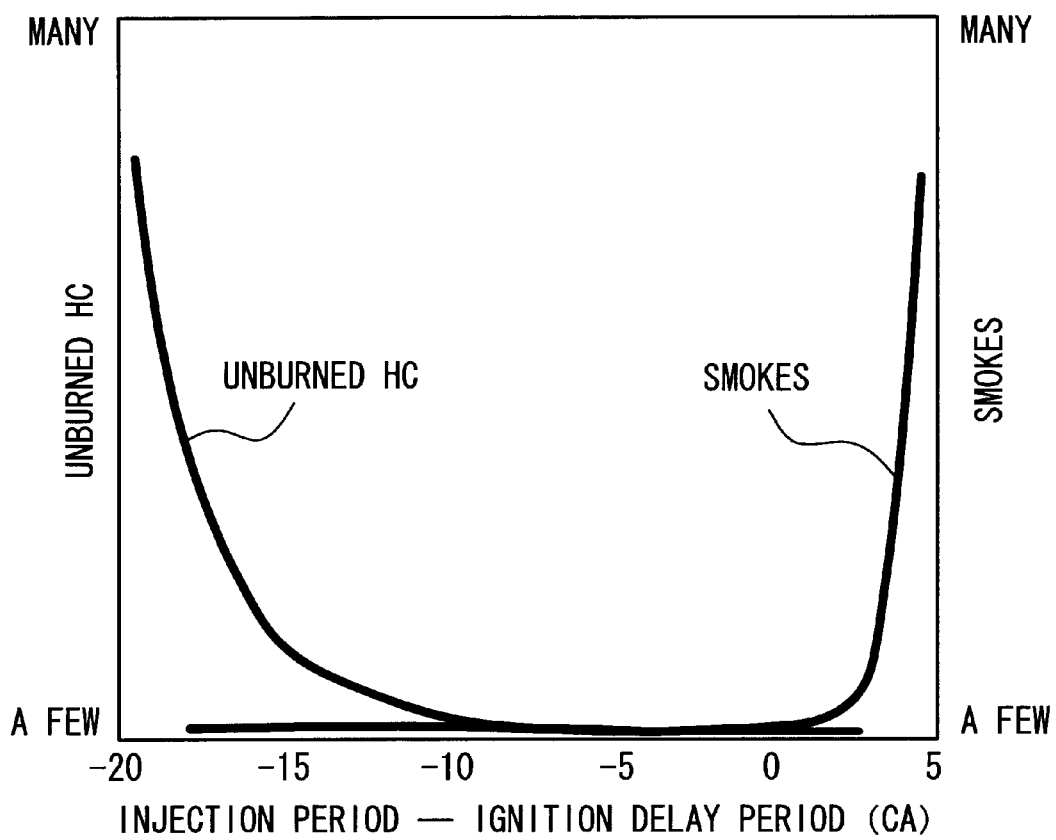
FIG. 6 is a view showing an effect (smokes and HC) of the first embodiment.

On the other hand, with higher temperature, the injection timing IT is delayed and the injection period ITd is shortened, but since there is a control limit to an injection pressure, the injection period ITd is constant over a certain temperature and the ignition delay period is prolonged by delay of the injection timing IT. An effect of this embodiment is shown in FIG. 6 where an emission quantity of smokes and an emission quantity of unburned HC are shown related to the difference between the injection period and the ignition delay period (injection period–ignition delay period. The difference is increased on the negative side as an injection completion timing is earlier than an ignition start timing. The smokes can be reduced by a large margin due to the ignition delay period being longer than the injection period by nature of a low-temperature premixed combustion. In case the ignition delay period gets longer from this state (injection period–ignition delay period=0), at small differences there is no increase of unburned HC, but unburned HC start to increase rapidly from more than around 15 degrees of a crank angle.

In this embodiment, by adjustment of an injection period by controlling an injection timing and an injection pressure a relationship of (−15 degrees<injection period–ignition delay period<0) is maintained and therefore, an increase (deterioration) of smokes and HC is prevented.

A mechanism of an increase of smokes and HC will be explained in FIG. 7. When an ignition delay period is short (injection period–ignition delay period=5 CA), the time for the fuel to disperse becomes short and an equivalent ratio distribution in a cylinder becomes extremely rich. As a result, a lot of smokes occur caused by an oxygen density reduction due to heavy EGR in addition to the above richness. On the other hand, when the ignition delay period gets long, the equivalent ratio distribution becomes very lean. When the ignition delay period is more than a certain degree (injection period–ignition delay period=−20 CA), the fuel spreads out into the entire combustion chamber equally and the equivalent ratio distribution becomes extremely lean and moreover, the fuel in the vicinity of the cylinder wall increases. As a result, an emission quantity of unburned HC increases rapidly caused by a decrease of a combustion temperature in addition to this above condition.

Figure 7:
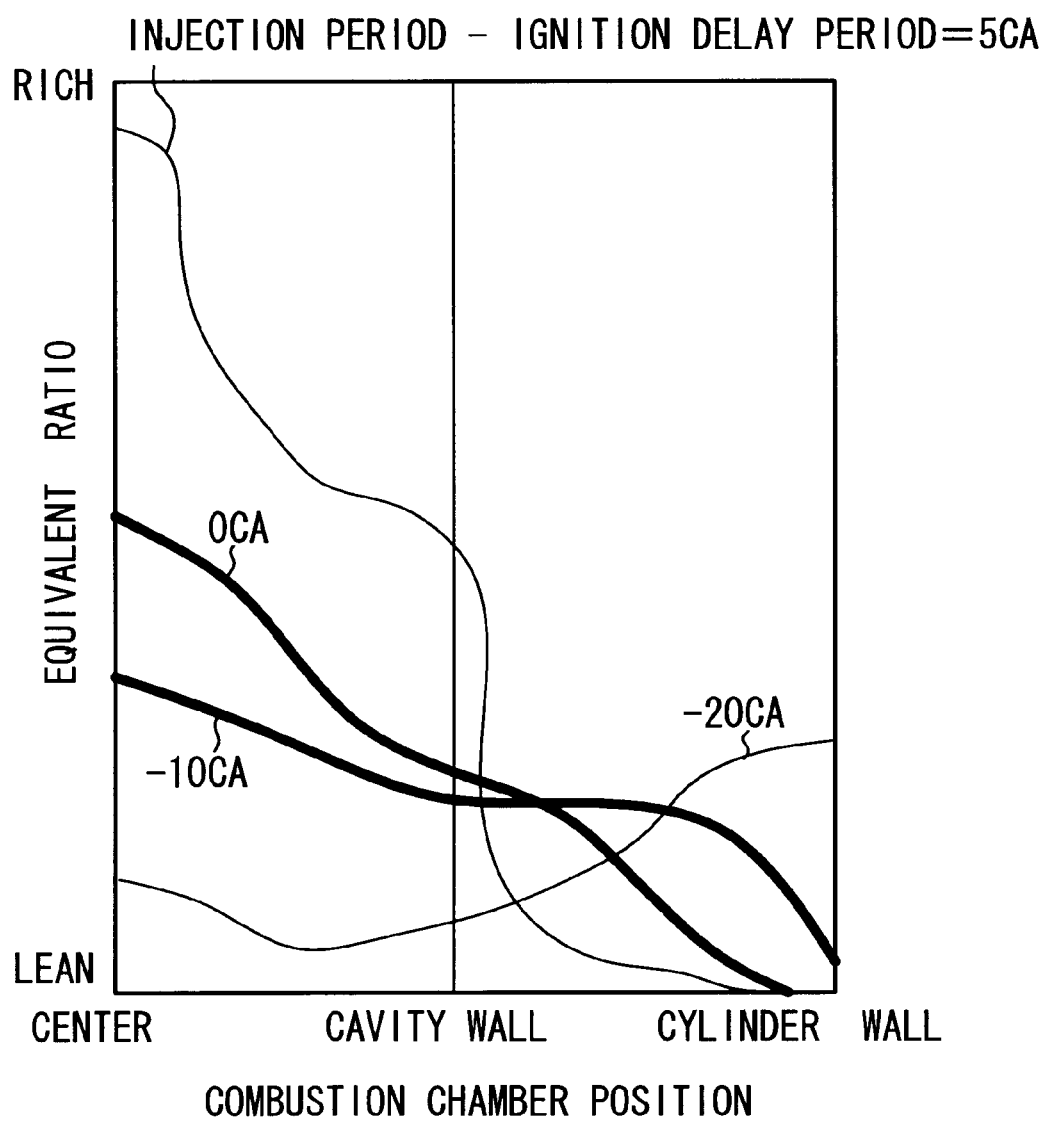
FIG. 7 is a view showing an effect (equivalent ratio distribution) of the first embodiment.

When injection period–ignition delay period=0 CA or −10 CA in FIG. 7, an equivalent ratio in the vicinity of a cylinder center becomes richer compared with the ratio in the vicinity of a cylinder wall and also a change of the equivalent ratio from the vicinity of the cylinder center to the vicinity of the cylinder wall becomes slow, which provides an optimal characteristic. The maximum equivalent ratio may be somewhat off the cylinder center; it need not be right at the cylinder center itself.

As described above, an emission quantity of smokes and HC has a relation with a period of from the fuel injection completion to the ignition delay period (injection period–ignition delay period), as shown in FIG. 6 and when the condition is met where −15 degrees<injection period–ignition delay period<0 degree, both smokes and unburned HC can be reduced. An equivalent ratio distribution varies corresponding to a change of period from the fuel injection completion to the ignition start as shown in FIG. 7. When the equivalent ratio distribution is controlled as a thick line in FIG. 7 (such as the difference between injection period and ignition delay period equal to 0 CA or −10 CA), both smokes and HC can be reduced.

According to the embodiment, an equivalent ratio distribution in the combustion chamber at an ignition start is controlled such that an equivalent ratio in the vicinity of the cylinder center is relatively richer compared with that in the vicinity of the cylinder wall and also a change of an equivalent ratio from the cylinder center vicinity to the cylinder wall vicinity is relatively smooth.

Thereby, the problem that the equivalent ratio in the vicinity of the cylinder center becomes so lean (which increases the emission quantity of unburned HC) is solved. Therefore, both smokes and unburned HC can be reduced.

Moreover, according to the embodiment, by shortening a period from the fuel injection completion to the ignition start at controlling the equivalent ratio, overspreading of the fuel into the combustion chamber can be prevented and an optimal equivalent ratio distribution can be made.

Further, according to the embodiment, by making a crank angle from the injection completion to the ignition start at controlling the equivalent ratio smaller than a predetermined crank angle (namely, a crank angle where an emission quantity of unburned HC starts to increase rapidly), an optimal equivalent ratio distribution can be made and both smokes and unburned HC can be reduced. Also by controlling the equivalent ratio based upon a crank angle, the potential negative influence of disturbance due to an engine rotation number is eliminated and regardless of the engine rotation number, a proper effect can always be achieved.

According to the embodiment, by decreasing the crank angle from the fuel injection completion to the ignition start to less than 15 degrees, an optimal equivalent ratio which has been confirmed by the inventors can be achieved and both smokes and unburned HC can be reduced.

According to the embodiment, by advancing the injection timing and also by prolonging the injection period based upon adjustment of the injection pressure, the relationship −15 degrees<injection period–ignition delay period<0 degree can be achieved. Either the injection timing or the injection period may be controlled as follows (1) or (2).

(1) A period from an injection completion to an ignition start is shortened by advancing an injection timing. An ignition delay period is shortened (in terms of advanced crank angle) by advancing the start of the injection period and as a result, the period from the injection completion to the ignition start is shortened. This is illustrated in FIG. 8(c).

In terms of controlling the equivalent ratio, the ignition delay period is shortened by advancing the injection period and as a result, the period from the injection completion to the ignition start is shortened. Thus, an overspreading of the fuel throughout the combustion chamber is prevented and the optimal equivalent ratio distribution is obtained.

(2) A period from an injection completion to an ignition start is shortened by prolonging an injection period. Under this state, the end point of the injection time is closer to an ignition timing and as a result, the period from the fuel injection completion to the ignition start can be shortened. (see FIG. 8(d) in this regard).

In terms of controlling the equivalent ratio, because the period from the fuel injection completion to the ignition start is be shortened, an overspreading of fuel into the combustion chamber is prevented and the optimal equivalent ratio distribution is obtained.

Compared with the above (1) and (2), in the embodiment where the period from the fuel injection completion to the ignition start is shortened by advancing the fuel injection timing, as well as prolonging the fuel injection period, the following effect can be obtained.

There is a case where a crank angle from the injection completion to the ignition start does not becomes less than 15 degrees all the time only by advancing the injection timing, but when together with prolonging the injection period, it becomes less than 15 degrees. Also the combustion start timing does not change all the time as desired only by prolonging the injection period. That is, the combustion start is kept delayed as shown in FIG. 8(d), but when together with advancing the fuel injection timing, the combustion start timing can be set as the optimal timing (about 15 degrees after a top dead center is desirable) as in FIG. 8(e).

According to the embodiment, as for controlling the equivalent ratio, a fuel injection period is prolonged by decreasing a fuel injection pressure and as a result, the period from the fuel injection completion to the ignition start is shortened. Accordingly, an overspreading of the fuel into the combustion chamber is prevented and the optimal equivalent ratio distribution is obtained by a relatively simple control of the fuel injection pressure.

In the embodiment, the fuel injection period is prolonged by lowering the fuel injection pressure, but other than that, an injection rate is lowered by controlling a lift quantity of a needle valve (it is limited to a case of a fuel injection nozzle capable of randomly controlling the needle valve lift quantity by an piezoelectric element) so that the injection period can be prolonged.

A second embodiment will be explained as follows in connection with FIG. 9.

Figure 9:
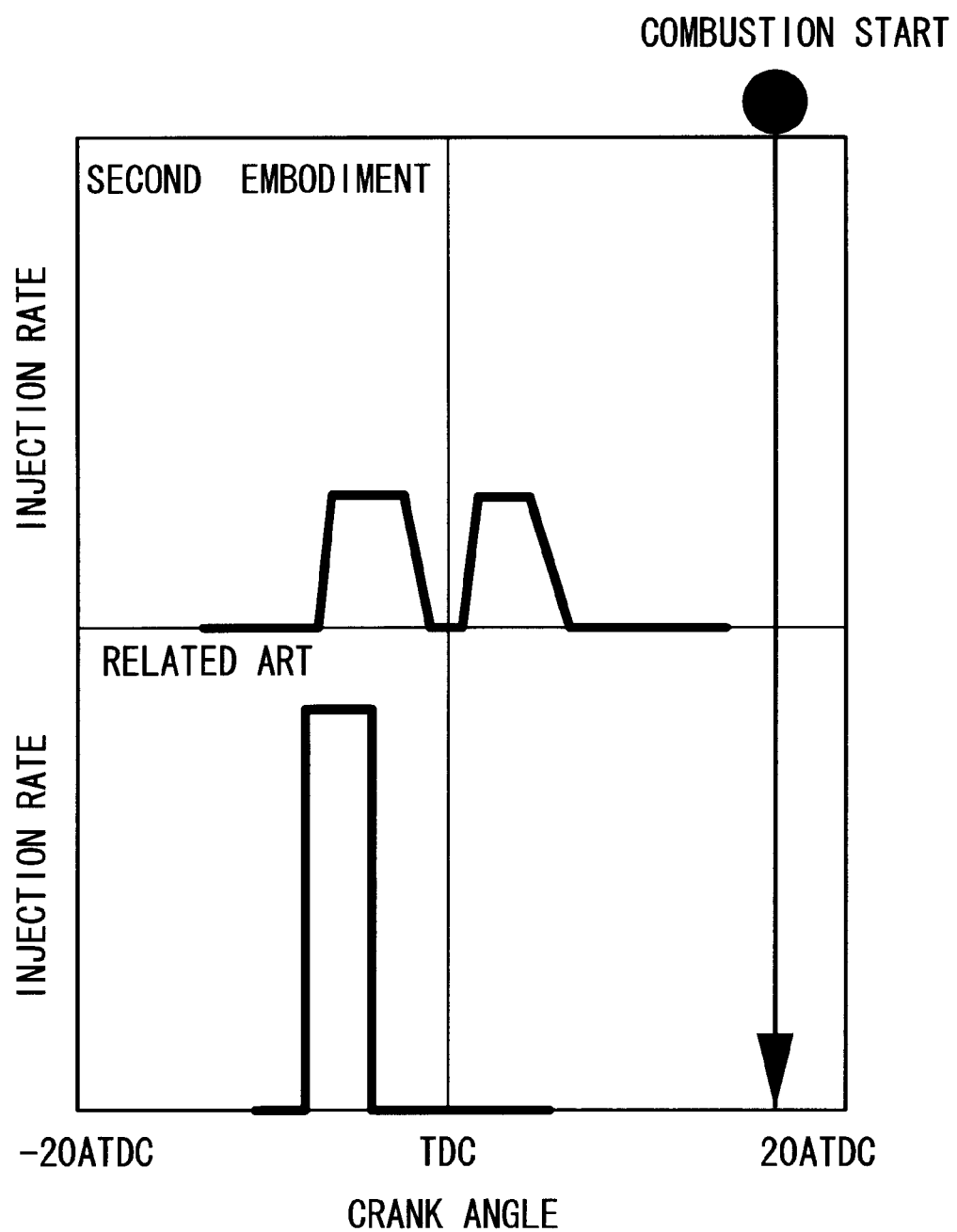
FIG. 9 is an injection pattern view showing a second embodiment of the invention.

FIG. 9 shows an injection rate pattern compared with an earlier example. Namely, in the second embodiment a split injection is used. Control of the split injection, such as in the common rail system in FIG. 2, can be performed by switching a three-way electromagnetic valve (off-on-off-on-off). In the second embodiment, time from an injection completion to an ignition start is not controlled, but an equivalent ratio distribution is still controlled. When the time to the ignition becomes long, the equivalent ratio distribution is positively controlled toward a rich side. In this case, a rich portion at a combustion center is more effectively formed that is less influenced by squish and swirl.

Figure 10:
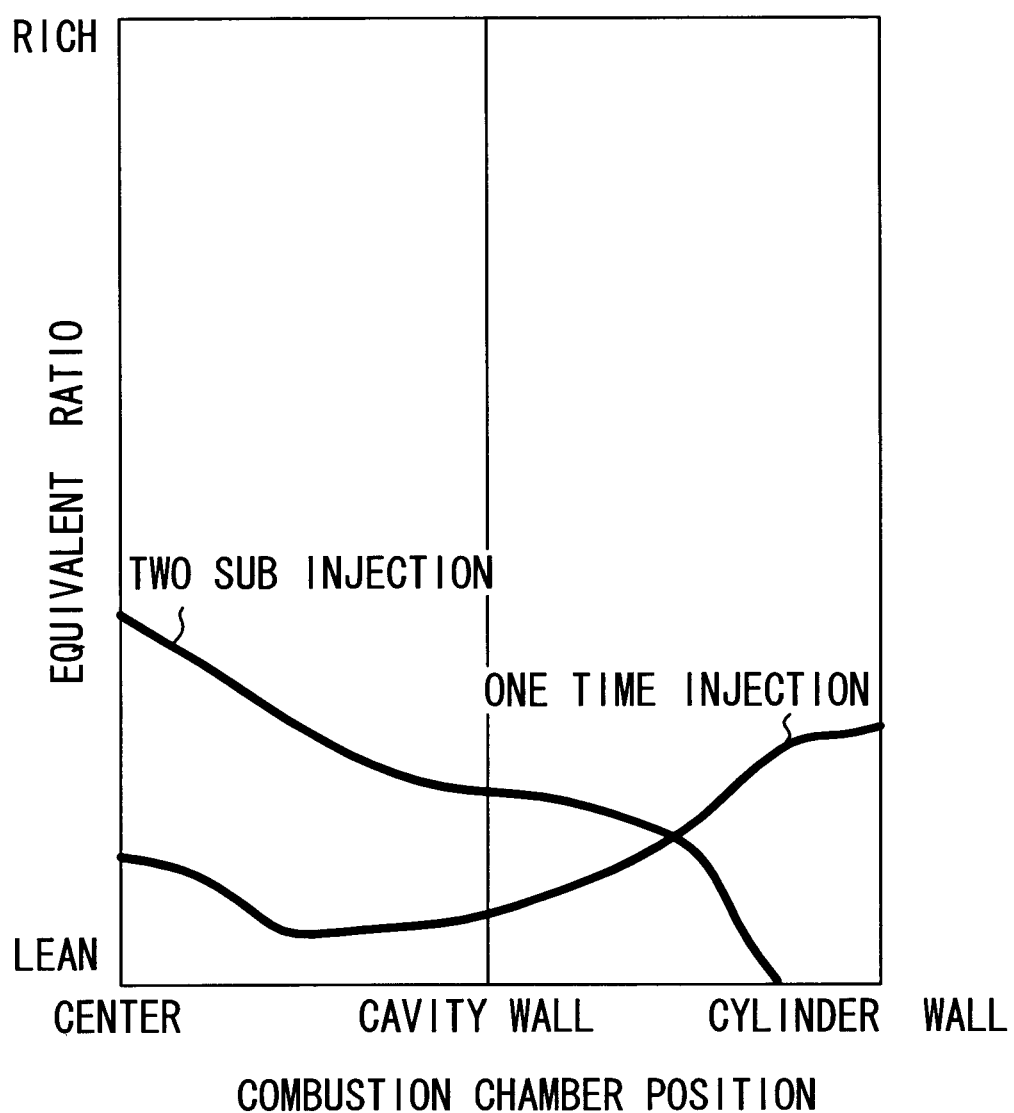
FIG. 10 is a view showing an effect of the second embodiment.

FIG. 10 shows an effect to an equivalent ratio distribution in case of the split injection (two sub-injections) compared with a one-time injection. By the split injection a penetration of a first fuel spray is weakened, a fuel injection velocity is slowed down, and the fuel remains in the vicinity of the fuel injection nozzle. Accordingly, a rich mixture is formed at a combustion chamber center and this rich mixture spreads out by the time of the ignition and at the ignition time such that an equivalent ratio distribution proper for a low-temperature premixed combustion can be made.

Particularly, according to the second embodiment, the equivalent ratio distribution is controlled by decreasing a fuel injection rate to decrease the spreading of the fuel into the combustion chamber and an emission quantity increase of unburned HC is restricted. The fuel injection rate is reduced at low load or low temperature when the ignition delay period becomes long and HC increase, so that even when the fuel injection period is relatively short, the spread of the fuel is prevented and HC increase due to too much leanness can be prevented. The split injection of the fuel is used for reducing the fuel injection rate and as a result, the spread of the fuel is prevented by a weakened penetration of the fuel spray and the fuel spray can be floated at the combustion chamber center.

In this second embodiment, two sub-injections are used, but more injections can be used and the penetration is weakened more as a split number increases.

The entire contents of Japanese Patent Application No. 2001-385071, filed Dec. 18, 2001 to which priority is claimed are incorporated herein by reference.

While only selected embodiments have been chosen to illustrate the present invention, it will be apparent to those skilled in the art from this disclosure that various changes and modifications can be made herein without departing from the scope of the invention as defined with reference to the appended claims. Furthermore, the foregoing description of the embodiments according to the present invention are provided for illustration only, and not for the purpose of limiting the invention as defined by the appended claims and their equivalents.

What is claimed:

1. An apparatus for controlling a diesel engine comprising:

a temperature lowering device which lowers a combustion temperature in a combustion chamber; and a fuel injection control apparatus which controls a fuel injection to prolong an ignition delay period under operation of the temperature lowering device in a manner that a heat release pattern in the combustion chamber becomes a one-step combustion state, wherein, at an ignition start, an equivalence ratio distribution in the combustion chamber is corrected by the fuel injection control apparatus in a manner that an equivalent ratio is richer in the vicinity of a cylinder center than in the vicinity of a cylinder wall and gradually changes from the cylinder center to the cylinder wall.

2. An apparatus according to claim 1, wherein the equivalent ratio distribution is performed such that a period from a fuel injection completion to an ignition start is shortened by the fuel injection control apparatus.

3. An apparatus according to claim 2, wherein the equivalent ratio distribution is performed such that a crank angle from a fuel injection completion to an ignition start is made less than a predetermined crank angle by the fuel injection control apparatus.

4. An apparatus according to claim 3, wherein the equivalent ratio distribution is performed such that a crank angle from a fuel injection completion to an ignition start is made less than 15 degrees by the fuel injection control apparatus.

5. An apparatus according to claim 1, wherein the equivalent ratio distribution is performed such that a period from a fuel injection completion to an ignition start is shortened by advancing a fuel injection timing by the fuel injection control apparatus.

6. An apparatus according to claim 1, wherein the equivalent ratio distribution is performed such that a period from a fuel injection completion to an ignition start is shortened by prolonging a fuel injection period by the fuel injection control apparatus.

7. An apparatus according to claim 1, wherein the equivalent ratio distribution is performed such that a period from a fuel injection completion to an ignition start is shortened both by advancing a fuel injection timing and by prolonging a fuel injection period by the fuel injection control apparatus.

8. An apparatus according to claim 1, wherein the equivalent ratio distribution is performed such that a period from a fuel injection completion to an ignition start is shortened by reducing a fuel injection pressure by the fuel injection control apparatus.

9. An apparatus according to claim 1, wherein
the equivalent ratio distribution is performed by reducing a fuel injection rate by the fuel injection control apparatus.

10. An apparatus according to claim 9, wherein
the equivalent ratio distribution is performed by reducing the fuel injection rate when the ignition delay period becomes longer, thereby bringing an increase of hydrocarbons.

11. An apparatus according to claim 9, wherein
the equivalent ratio distribution is performed by reducing the fuel injection rate by dividing a fuel injection into at least two sub-fuel injections.

12. A method for controlling a diesel engine comprising:
lowering a combustion temperature in a combustion chamber, and controlling a fuel injection to prolong an ignition delay period in a manner that a heat release pattern becomes a one-step combustion state and to control an equivalent ratio distribution in a combustion chamber at an ignition start in a manner that an equivalent ratio is richer in the vicinity of a cylinder center than in the vicinity of a cylinder wall and gradually changes from the cylinder center to the cylinder wall.

* * * * *